INVENTOR
CHARLES B. SIPE
BY
Hood, Gust & Irish
ATTORNEYS

INVENTOR
CHARLES B. SIPE
BY
Hood, Gust & Irish
ATTORNEYS

3,392,798
VEHICLE WITH COIN-CONTROLLED SEATS
Charles B. Sipe, 4121 Glencairn Lane,
Indianapolis, Ind. 46226
Filed Aug. 3, 1967, Ser. No. 658,269
14 Claims. (Cl. 180—102)

ABSTRACT OF THE DISCLOSURE

A vehicle comprising a plurality of passenger stations, each passenger station comprising a seat, actuating means for alternatively rendering said seat usable and nonusable, and coin-operated means for operating said actuating means to render said seat usable. In a preferred embodiment of the invention, control means are provided so that the operator of the vehicle can render said seats nonusable.

Specification

Figure 1:
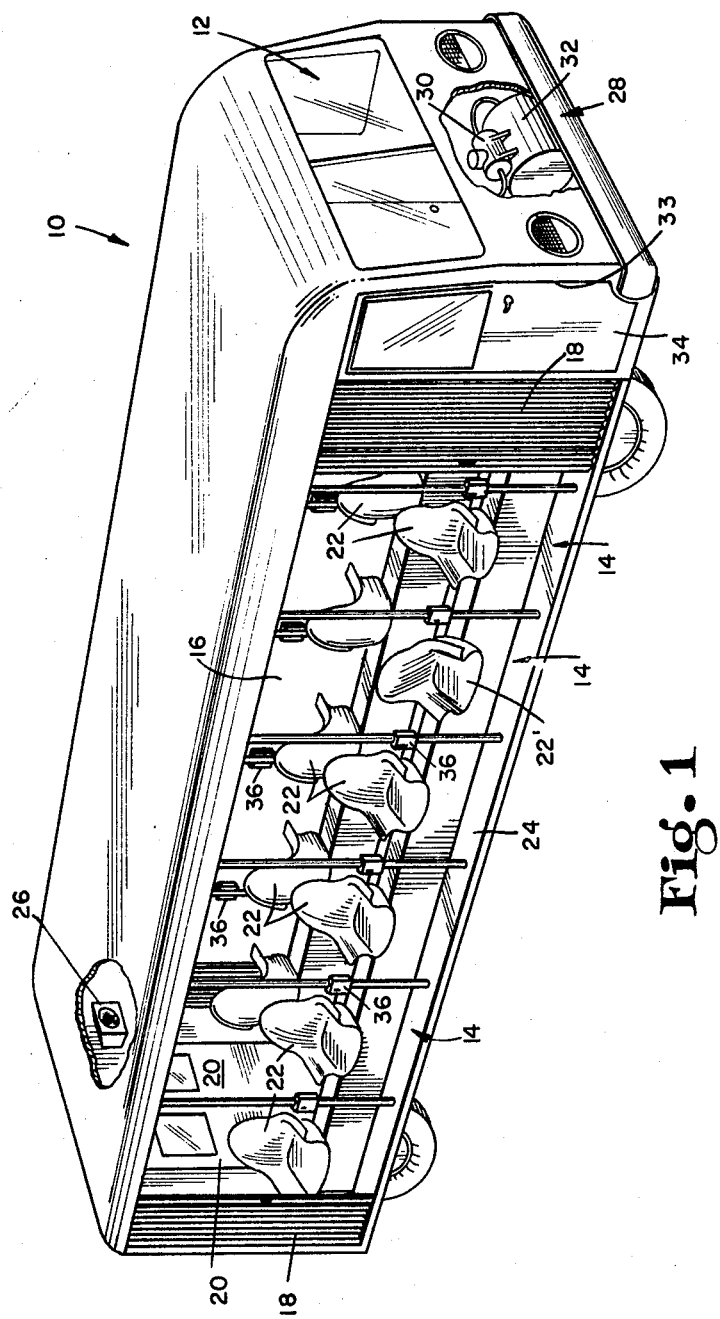

The present invention relates to vehicles, and more particularly to the provision of a vehicle comprising coin-controlled seats, which vehicle is ideally suited for providing transportation in shopping areas, airport terminals, large exhibition centers, and the like.

My invention relates specifically to small moderately priced buses, each of which can be operated by one man. Such busses will provide an expandable and more than ample system of urban transportation system for shoppers in downtown areas where regular automobile traffic is restricted. In fact, my invention will make it economically possible to ban the use of private vehicles in certain congested areas and to require people to use public transportation. It is a primary object of my invention, therefore, to provide very cheap public transportation which everyone can afford to use.

Thus, my invention will help curb the creeping blight affecting some downtown areas and which is caused, in part, by customers being driven away by congested traffic conditions and high parking costs. It is well known that the tendency of customers to shop at outlying shopping centers is causing financial hardship to downtown merchants and building owners and tax losses to the Government.

Preferably, my vehicle is arranged to be operated by one operator who does not have to collect money, tickets, tokens or the like from passengers. Thus, large numbers of passengers may board and leave the vehicle in a small amount of time at each of its scheduled stops.

My vehicle is arranged so that each passenger, upon boarding the vehicle, must deposit a coin into a coin-operated means which is connected to a means for moving an associated seat to a usable position. After the vehicle has travelled a predetermined distance, the same actuating means is then operated by the operator of the vehicle to move the seat to a non-usable position where it will stay until another coin is deposited into the coin-operated means.

My vehicle, therefore, comprises a plurality of passenger stations, each of which comprises a seat movable between a use position and a non-use position, actuating means for moving the seat between its use position and non-use position, and coin-operated means for controlling the actuating means; and an operator's station comprising the necessary controls for operating the vehicle and control means for operating the actuating means associated with each seat selectively to move the seats to their non-use positions.

Each passenger station is arranged so that the occupant of a seat may deposit another coin into a coin-operated means to establish a circuit condition preventing the operation of the actuating means associated with the seat by the operator of the vehicle, thereby to maintain the seat in its use position.

It is another object of my invention, therefore, to provide a vehicle for a public transportation system, which vehicle comprises coin-controlled seats.

Another object of my invention is to provide such a vehicle wherein each of the seats is movable between a use position and a non-use position and wherein an actuating means is operatively connected to each seat and arranged to move it between its use position and non-use position, the actuating means being controlled by a coin-operated means.

Other objects and features of my invention will become apparent as this description progresses.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 2:
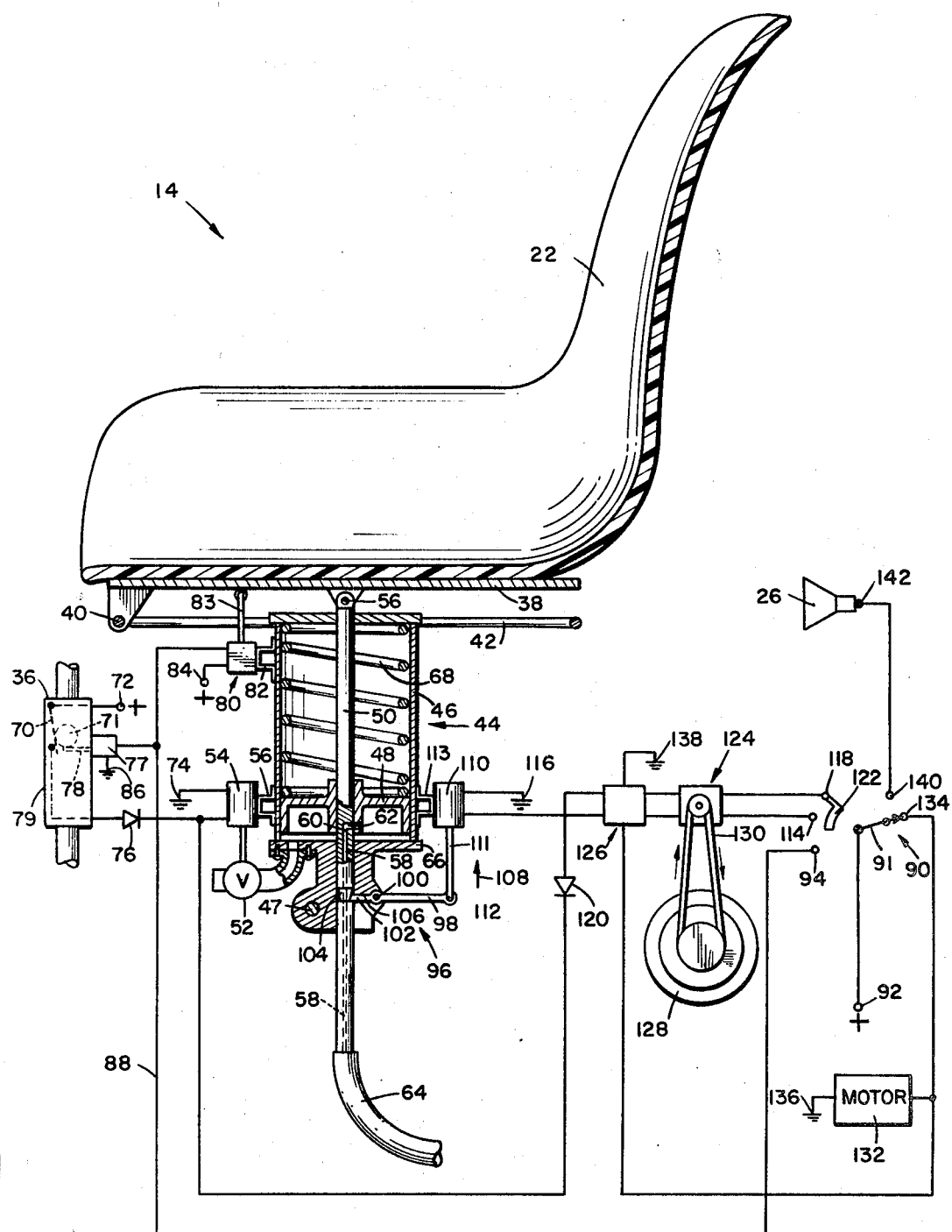
Figure 3:
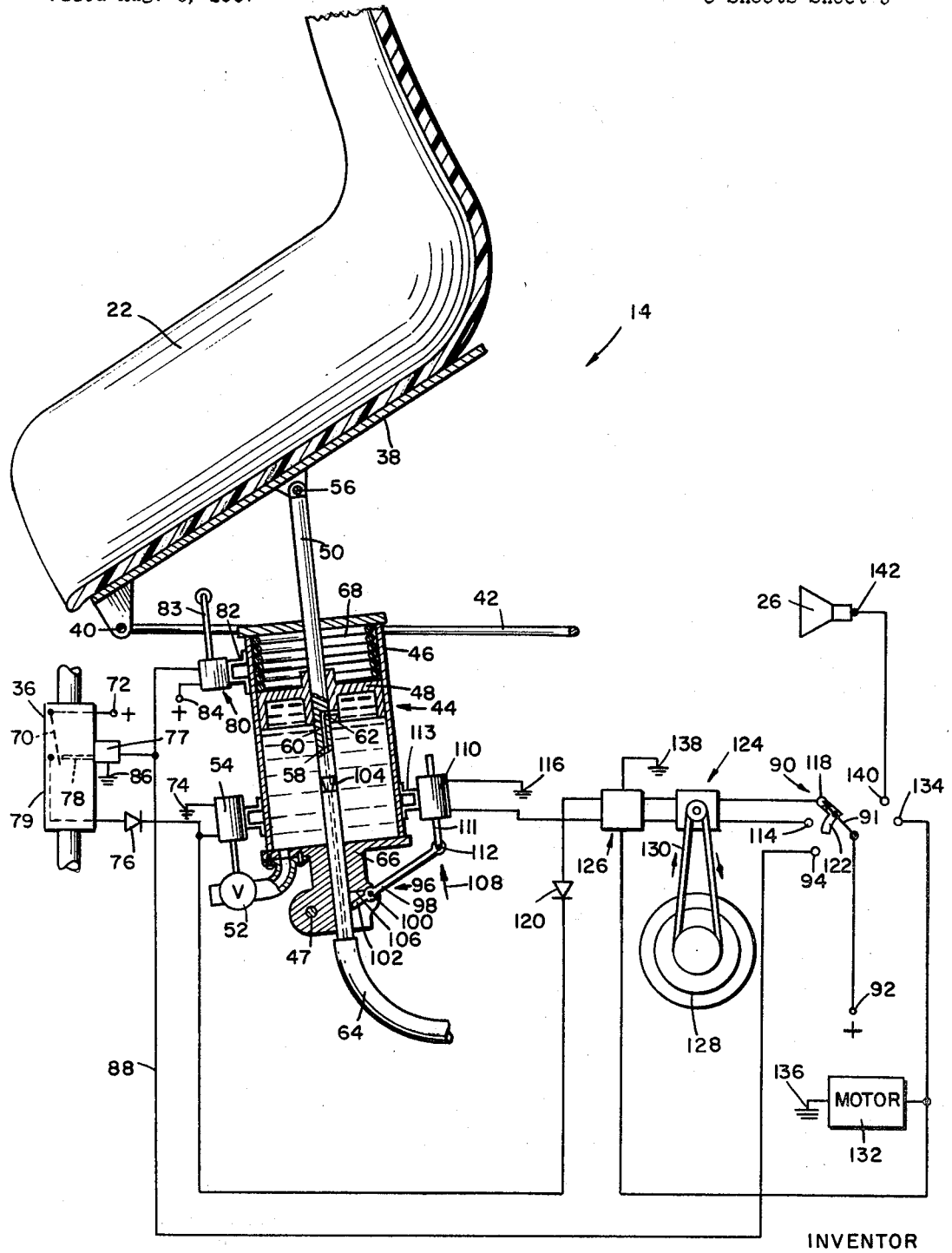

In the drawings:

FIG. 1 is a perspective view, partially cut away, showing a vehicle comprising an operator's station and a plurality of passenger stations, each passenger station including a coin-controlled seat;

FIG. 2 is a schematic view showing a seat in its use position, coin-operated means, actuating means for moving the seat, and control means which is used by the operator of the vehicle to move the seat to its non-use position; and FIG. 3 is a schematic view identical to FIG. 2 except that the seat is shown in its non-use position and the actuating means is shown holding the seat in such non-use position.

Referring particularly to the drawings, it will be seen that I have shown a vehicle, indicated generally by the reference numeral 10, comprising an operator's station, indicated generally by the reference numeral 12, and a plurality of passenger stations, each indicated generally by the reference numeral 14.

The illustrative vehicle 10 is of the open-air type. That is, the sides 16 of the vehicle 10 are open throughout the length of the passenger compartment and from the floor to the ceiling of the passenger compartment. I have provided clear plastic folding doors 18 at each end of each side 16 so that, during inclement weather, the sides 16 may be closed. In such a case, the passengers boarding the vehicle 10 will use the doors 20 at the rear of the vehicle.

Each passenger station 14 comprises a seat 22, which, in the illustrative embodiment, is facing toward the outside of the vehicle 10. Preferably, the seats 22 are arranged to be turned inwardly of the vehicle 10 if the doors 18 are closed and the rear doors 20 are used by the passengers.

The vehicle 10 is provided with a step 24 extending along each side thereof, the steps 24 providing access to the seats 22. That is, when a seat 22 is in its use position, a passenger may step upon the step 24 in front of the seat 22 and then be in a position to occupy the seat 22.

As shown in FIG. 1, all of the seats 22, except the seat indicated by the reference numeral 22', are in use positions, the seat 22' being in non-use position. It can be seen, therefore, that the seat 22' is tilted forwardly out over the step 24 extending along in front of the seat 22'. Thus, a passenger is prevented from occupying the space on the step 24 in front of the seat 22' as long as it is in the non-use position. Specfiically, the rigid back of the seat 22' is sufficiently large to block or occupy completely the space above the portion of the step 24 extending along in front of the seat 22'. The reason for this arrangement is to prevent a person from stepping up onto the steps 24 and riding from stop to stop on the vehicle 10 without depositing the necessary money into the coin-operated means provided on the vehicle 10. Obviously, it would be unsafe for the passengers to ride on the steps 24.

Referring further to FIG. 1, it will be seen that the vehicle 10 is provided with a public address system represented by the speaker 26. The purpose of the public address system and the manner in which the public address system is operated will be discussed as this description progresses.

Located in the front end of the illustrative vehicle 10 is a pressurized fluid source, indicated generally by the reference numeral 28, the illustrative fluid source 28 comprising an air compressor 30 and an air tank 32. It will be understood, however, that the pressurized fluid source 28 may be a hydraulic system comprising a pump. The purpose of the pressurized fluid source 28 will become clear as this description progresses.

The operator's station 12, at the front of the vehicle 10, is, of course, provided with the necessary controls such as a steering wheel, brake pedal and an accelerator, none of which is shown. The operator's station 12 further includes the controls necessary for operating the seats 22, these last-mentioned controls being shown in FIGS. 2 and 3.

The vehicle 10 is provided with an opening 33, which is closed by the door 34, through which the operator may enter and leave the operator's station 12.

Referring still further to FIG. 1, it will be seen that each passenger station 14 comprises a coin receiver 36, hereinafter referred to as a coin-operated means 36. It will become apparent, from the following description, that a passenger must deposit a suitable coin into a coin-operated means 36 in order to render usable a seat 22, and, in a preferred embodiment of my invention, a passenger occupying a seat 22 must, after the vehicle 10 has travelled a predetermined distance, deposit an additional coin into the coin-operated means 36 associated with his seat 22 in order to continue to use his seat. Thus, in the illustrative embodiment of FIG. 1, in order to use the seat 22', a passenger must deposit a suitable coin into the coin-operated means 36 associated with the seat 22' in order to tilt the seat 22' backwardly to its use position.

Referring now to FIGS. 2 and 3, an illustrative means for moving each of the seats 22 between its use position and non-use position and the means for controlling the movement of the seats will be discussed.

The illustrative seat 22 is carried on a platform 38 which is pivotally connected, as indicated by the reference numeral 40, to a stationary member 42. Preferably, the stationary member 42 is an annulus which can be clamped to the vehicle 10 in order to anchor the seat 22. Since, in a preferred embodiment of the vehicle 10, the seats 22 can be rotated 180° relative to their positions illustrated in FIG. 1, means, not shown, must be provided for mounting the member 42 and the actuating means connected to the seat 22 in a selected position. Such mounting means are not a part of the present invention and, therefore, need not be illustrated and described herein.

A fluid motor, indicated generally by the reference numeral 44, is operatively connected to the platform 38 and arranged to pivot the platform 38 relative to the member 42. Thus, the fluid motor 44 is operatively connected to the seat and arranged alternatively to move the seat 22 between its use position shown in FIG. 2 and its non-use position shown in FIG. 3.

The illustrative fluid motor 44 comprises a cylinder 46, a piston 48 arranged for axial reciprocation in the cylinder 46, a piston rod 50 rigidly fastened in a conventional manner to the piston 48 and an exhaust valve 52 arranged to exhaust the cylinder 46, the cylinder 46 being mounted for pivotal movement about the axis indicated by the reference numeral 47.

The exhaust valve 52 is operated by a solenoid 54 mounted on the cylinder 46 by means, such as the bracket 56. Thus, the valve 52 and the solenoid 54 comprise means for selectively exhausting the cylinder 46. The piston rod 50 is pivotally connected at its upper end, as indicated by the reference numeral 56, to the platform 38. As shown in FIGS. 2 and 3, the piston rod 50 is considerably longer than the cylinder 46 and is provided with an axially extending opening 58, the upper end 60 of which is in communication with the interior of the cylinder 46 through a radially extending opening 62. The lower end of the piston rod 58 is received in one end of a flexible conduit 64, the other end, not shown, of the flexible conduit 64 being connected to the air tank 32. Thus, the cylinder 46 is always in communication with the air tank 32 regardless of the position of the piston 48. That is, when the piston 48 is in its lowermost position, the opening 62 will be positioned just above the top surface of the lower end 66 of the cylinder 46.

I have provided a spring 68 which is carried within the cylinder 46 and which is arranged to urge the piston 48 downwardly to the lower end 66 of the cylinder when the valve 52 is open. When the valve 52 is closed, the air pressure provided by the fluid source 28 will be effective to move the piston 48 in opposition to the spring 68. Thus, in recapitulation, the cylinder 46 is always in communication with the air tank 32, and, when the valve 52 is closed, the air pressure will move the piston 48 to its uppermost position, and, when the valve 52 is open, the spring 68 will move the piston 48 to its lowermost position. The uppermost position of the piston 48 is illustrated in FIG. 3. The valve 52 and the solenoid 54 are arranged, in a conventional manner, so that the valve 52 is normally closed when the solenoid 54 is deenergized.

The illustrated coin-operated means 36 comprises a switch 70 arranged to be closed by a coin, indicated by the reference numeral 71, thereby to permit the flow of current from the terminal 72 through the solenoid 54 to the ground terminal 74. When the solenoid 54 is so energized, the valve 52 is open.

It will be seen that I have illustrated a diode 76 in the circuit between the terminal 72 and the terminal 74.

The illustrative coin-operated means 36 further comprises a solenoid 77 having a plunger 78 arranged to hold the coin 71 in a position to close the switch 70. When the solenoid 77 is energized, the plunger 78 is moved from its position shown in FIGS. 2 and 3 to admit the coin 71 to the receptacle portion 79 of the coin-operated means 36. In order to energize the solenoid 77, I have provided a switch, indicated generally by the reference numeral 80, which is mounted on the cylinder 46 by means such as the bracket 82 and which is provided with a plunger 83 arranged to be operated by the platform 38. In the preferred embodiment, the switch 80 is of the make-break type so that, when the platform 38 is lowered, a surge of current will flow from the terminal 84 through the solenoid 77 to the ground terminal 86 to operate the solenoid 77, thereby to admit the coin 71 to the receptable portion 79.

From the above description, it will be apparent that, when a person deposits a coin into the coin-operated means 36, the switch 70 will be closed to energize the solenoid 54 to open the valve 52 so that the spring 68 will move the seat 22 to its use position. When the seat 22 reaches its use position, the switch 80 is operated for an instant to operate the solenoid 77 to admit the coin into the receptacle portion 79.

If the seat 22 is in its use position and the occupant of the seat does not want to be evicted at a particular stop, the occupant must deposit an additional coin into the coin-operated means 36 to close the switch 70, thereby to keep the valve 52 open. In order to collect such an additional coin after the stop has been made, I have provided an additional circuit 88 for energizing the solenoid 77. The circuit 88 is completed by the operator of the vehicle operating a manually-operated switch, indicated generally by the reference numeral 90. Specifically, the operator operates the switch 90 to complete a circuit from the terminal 92 through the wiper 91 of the switch 90 and the terminal 94 to the ground terminal 86.

I have provided a latch mechanism, indicated generally by the reference numeral 96, arranged securely to hold the seat 22 in its use position. The illustrative latch mechanism 96 comprises an arm 98 pivoted on the fluid motor 44, as indicated by the reference numeral 100, the forward end 102 of the arm 98 being arranged to engage a cut-out 104 in the piston rod 50 as shown in FIG. 2. The cut-out 104 is proportioned and arranged so that the tendency of the air pressure in the cylinder 46 to urge the piston 48 upwardly will hold the forward end 102 tightly against the surface 106 of the fluid motor 44, thereby to lock the piston rod 50 against axially upward movement. Thus, in order to release the forward end 102 from the cut-out 104, it is essential that the valve 52 be momentarily opened so that the arm 98 can be pivoted in the direction of the arrow 108. Specifically, the pressure in the cylinder 46 must be relieved through the valve 52 so that the spring 68 can urge the piston rod 50 slightly downwardly to permit the arm 98 to be pivoted in the direction of the arrow 108.

I have provided a solenoid 110 having a plunger 111 pivotally connected to the rear end of the arm 98 as indicated by the reference numeral 112, the solenoid 110 being mounted on the cylinder 46 by means such as the bracket 113. Preferably, the solenoid 110 will pivot the arm 98 in the direction of the arrow 108 when the solenoid is energized. In such an embodiment, either gravity or a spring, not shown, will act upon the plunger 111 and the arm 98 to pivot the arm 98 into position to engage the cut-out 104 as soon as the seat 22 reaches its use position. Thus, the coin 71 can be safely admitted to the receptacle portion 79 to open again the switch 70 without permitting the seat 22 to move to its non-use position.

The solenoid 110 is energized by completing a circuit from the terminal 92 through the wiper 91 and through a terminal 114 of the switch 90 to the ground terminal 116. In a similar manner, the solenoid 54, which opens the valve 52, is also energizable by current flow from the terminal 92 through the wiper 91, the terminal 118, the diode 120 and the solenoid 54 to the ground terminal 74. Thus, the operator of the vehicle 10 may operate the switch 90 to open momentarily the valve 52 and then to operate the solenoid 110 to pivot the arm 98 in the direction of the arrow 108 while the spring 68 is holding the piston rod 50 downwardly to release the forward end 102 of the arm 98. In order to maintain the valve 52 opens until the solenoid 110 is operated, the terminal 118 is provided with a portion 122 which extends to the left (as viewed in FIGS. 2 and 3) and slightly past the terminal 114 so that the solenoid 54 is energized when the solenoid 110 is energized. The structure of the terminal 118 is conventionally used when it is desirable to make and maintain contact with a terminal while the wiper 91 of the switch 90 is moved to an adjacent terminal.

In the preferred embodiment of my invention, the circuits between the terminals 118 and 74 and between the terminals 114 and 116 are completed through a centrifugal switch means, indicated generally by the reference numeral 124, and a normally-closed relay, indicated generally by the reference numeral 126.

The centrifugal switch 124 is drivingly connected to a rotating element 128 of the vehicle 10 by means such as the belt 130 so that, when the element 128 is rotating, the circuits between the terminals 118 and 74 and between the terminals 114 and 116 are held open. The rotating element 128 may be a wheel of the vehicle 10 or a rotating element of the transmission of the vehicle 10. Centrifugal switches which are arranged to hold circuits either open or closed while the rotor of the centrifugal switch is rotating are well known and need not be discussed in this description.

The relay 126 is arranged to keep the circuits between the terminals 118 and 74 and the termnials 114 and 116 open as long as the vehicle-driving motor 132 is energized. Thus, the coil of the relay 126 is energized by current flow through the supply circuit for the motor 132. In the illustrative embodiment, the supply circuit for the motor 132 comprises the circuit beginning with the terminal 92 and continuing through the wiper 91 and the terminal 134 of the switch 90 to the ground terminal 136. The relay 126 is, therefore, energized by current flow from the terminal 92 through the wiper 91 and the terminal 134 to the ground terminal 138.

The centrifugal switch 124 and the relay 126 provide two separate means for preventing the operation of the relay 110 while the vehicle 10 is in motion and its motor 132 is energized. Thus, the seat 22 cannot be moved to its non-use position while the vehicle 10 is in motion.

In order to advise occupants of seats 22 that they must either make a further deposit into the coin-operated means associated with their seats or be evicted from their seats, I have provided a public address system comprising the speaker 26. The speaker 26 is energized by current flow from the terminal 92 through the wiper 91 and terminal 140 of the switch 90 to the terminal 142 of the speaker 26. When the speaker 26 is energized, the operator of the vehicle may speak into a conventional microphone or he may play a recording device which is programmed to make the necessary announcements.

From the above description, it will be apparent that the switch 90 is a control means operated by the operator of the vehicle 10 to move the seats 22 to their non-use positions. If a person is sitting in a seat 22 and does not deposit a suitable coin into the coin-operated means associated with the seat, the person will be evicted when the operator of the vehicle 10 operates the switch 90 to operate the solenoids 54 and 110.

It will also be apparent that by controlling the pressure in the air tank 32, each seat 22 may be moved in such a manner as to evict gently a person occupying the seat.

What is claimed is:

1. A vehicle comprising a seat, actuating means for alternatively rendering said seat usable and unusable, said actuating means being operatively connected to said seat, coin-operated means for operating said actuating means to render said seat usable, said coin-operated means being operatively connected to said actuating means, manually-operated control means for operating said actuating means to render said seat unusable, and an operator's station including controls for operating said vehicle, said control means being positioned in said operator's station and operatively connected to said actuating means.

2. A vehicle comprising a seat, actuating means for alternatively rendering said seat usable and unusable, said actuating means being operatively connected to said seat, coin-operated means for operating said actuating means to render said seat usable, said coin-operated means being operatively connected to said actuating means, electrically-operated means for energizing and deenergizing said actuating means, said coin-operated means comprising switch means dominating said electrically-operated means, and said switch means being arranged so that, when a suitable coin is deposited into said coin-operated means, said actuating means is deenergized, thereby to render said seat usable.

3. A vehicle as in claim 2 wherein said coin-operated means further comprises a receptacle for receiving and storing coins deposited into said coin-operated means and electrically-operated means for admitting coins deposited into said coin-operated means into said receptacle, and further comprising second switch means dominating said last-mentioned electrically-operated means, said second switch means being arranged on said seat so that, when said seat is rendered usable, said second switch means will be operated to energize said last-mentioned electrically-operated means.

4. A vehicle as in claim 3 further comprising third switch means for operating said last-mentioned electrically-operated means, and an operator's station including controls for operating said vehicle, said third switch means being arranged so that an operator can energize said last-mentioned electrically-operated means when said seat has already been rendered usable and a coin has been thereafter deposited into said coin-operated means.

5. A vehicle comprising a plurality of seats, each of said seats being movable between a use position and a non-use position, actuating means for moving each of said seats between its use position and non-use position, coin-operated means dominating each of said actuating means, each coin-operated means being operatively connected to its associated actuating means so that, when a suitable coin is deposited into said coin-operated means, said actuating means will move said seat connected thereto to its use position, and control means for energizing and deenergizing each of said actuating means, each of said actuating means being arranged so that, when said actuating means is energized, said seat connected thereto is moved to its non-use position, and, when said actuating means is deenergized, said seat connected thereto is moved to its use position.

6. A vehicle as in claim 5 wherein each of said actuating means comprises a fluid motor, wherein each of said control means is an electrically-operated control valve, and wherein each of said coin-operated means comprises coin-operated switch means dominating one of said electrically-operated control valves, each of said coin-operated means being arranged so that, when a suitable coin is deposited therein, the actuating means connected thereto will be deenergized.

7. A vehicle as in claim 6 further comprising a pressurized fluid source and means for connecting said fluid source to each of said actuating means.

8. A vehicle comprising a plurality of seats, each of said seats being movable between a use position and a non-use position, actuating means for moving each of said seats between its use position and non-use position, coin-operated means dominating each of said actuating means, each coin-operated means being operatively connected to its associated actuating means so that, when a suitable coin is deposited into said coin-operated means, said actuating means will move said seat connected thereto to its use position, each of said seats comprising a rigid back, means for pivotally mounting each of said seats for movement between its use position and non-use position, each of said mounting means being arranged so that, when the seat mounted thereon is in its non-use position, said back of said seat is tilted forwardly wholly to overlie the portion of said seat on which a person would sit.

9. A vehicle comprising a plurality of seats, each of said seats being movable between a use position and a non-use position, actuating means for moving each of said seats between its use position and non-use position, coin-operated means dominating each of said actuating means, each coin-operated means being operatively connected to its associated actuating means so that, when a suitable coin is deposited into said coin-operated means, said actuating means will move said seat connected thereto to its use position, a latch associated with each of said seats, each of said latches being arranged releasably to hold its associated seat in its use position, said latches being electrically operated, an operator's station, and control means operatively connected to said latches and arranged to release the seats associated with said latches, said control means comprising switch means positioned in the operator's station.

10. A vehicle as in claim 9 further comprising centrifugal switch means operatively connected to said vehicle and said control means, said centrifugal switch being arranged to prevent operation of said latches to release said seats when said vehicle is moving.

11. A vehicle comprising a plurality of passenger stations, each of said passenger stations comprising a seat, means for mounting said seat for movement between a use position and a non-use position, a fluid motor operatively connected to said seat and arranged to move said seat between its use position and non-use position, said fluid motor comprising a driven member engaging said seat, a fluid chamber and an electrically-operated control valve connected to said chamber, coin-operated means comprising switch means for energizing said control valve, said switch means being arranged to be operated by a suitable coin deposited into said coin-operated means, and a receptacle for receiving and storing the coins deposited into said coin-operated means, means for connecting said switch means to said electrically-operated control valve so that, when a suitable coin is deposited into said coin-operated means, said control valve will be operated to energize said motor, thereby to move said seat to its use position, and further comprising a pressurized fluid source, and means for connecting said pressurized fluid source to said chamber.

12. A vehicle as in claim 11 wherein each of said passenger stations further comprises electrically-operated latch means arranged releasably to hold said seat in its use position, and further comprising second switch means for releasing said latch means, said second switch means being positioned in the operator's station of said vehicle and connected to said latch means.

13. A vehicle as in claim 12 wherein said chamber is a cylinder, wherein said driven member is a piston rod arranged for axial reciprocation in said chamber, said rod being provided with a cut-out, said latch means being engageable in said cut-out to hold said seat in its use position.

14. A vehicle as in claim 11 wherein said chamber is a cylinder, wherein said driven member is a piston rod arranged for axial reciprocation in said chamber, said piston rod being provided with an axially extending opening, and wherein said means for connecting said fluid source to said chamber comprises a flexible conduit connected to the first end of said opening, the second end of said opening being in communication with said chamber when said seat is in its use position and its non-use position, and spring means acting upon said rod, said spring means being effective to move said seat to its use position when said control valve is exhausting said chamber.

References Cited
UNITED STATES PATENTS

| | | | |
|---|---|---|---|
| 1,148,979 | 8/1915 | Masters. | |
| 2,517,048 | 8/1950 | Stacy et al. | 297—217 |
| 2,564,762 | 8/1951 | Howard et al. | 194—69 X |
| 2,651,354 | 9/1953 | Fowler et al. | 297—217 |
| 2,736,414 | 2/1956 | Gaddis | 194—9 |

KENNETH H. BETTS, *Primary Examiner.*

UNITED STATES PATENT OFFICE
CERTIFICATE OF CORRECTION

Patent No. 3,392,798                                        July 16, 1968

Charles B. Sipe

It is certified that error appears in the above identified patent and that said Letters Patent are hereby corrected as shown below:

Column 7, line 23, before "its" insert -- to --.

Signed and sealed this 9th day of December 1969.

(SEAL)
Attest:

Edward M. Fletcher, Jr.                          WILLIAM E. SCHUYLER, JR.
Attesting Officer                                      Commissioner of Patents